(12) United States Patent
Hamazaki (10) Patent No.: US 12,332,091 B2
(45) Date of Patent: Jun. 17, 2025

(54) CONTROL DEVICE OF ROTATION DETECTOR

(71) Applicant: MABUCHI MOTOR CO., LTD., Chiba (JP)

(72) Inventor: Kohei Hamazaki, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/256,209

(22) PCT Filed: Dec. 10, 2021

(86) PCT No.: PCT/JP2021/045684
§ 371 (c)(1),
(2) Date: Jun. 7, 2023

(87) PCT Pub. No.: WO2022/124412
PCT Pub. Date: Jun. 16, 2022

(65) Prior Publication Data
US 2023/0392958 A1 Dec. 7, 2023

(30) Foreign Application Priority Data
Dec. 11, 2020 (JP) ................. 2020-205912

(51) Int. Cl.
*G01D 5/20* (2006.01)
*G01D 5/244* (2006.01)
(52) U.S. Cl.
CPC ............. *G01D 5/20* (2013.01); *G01D 5/244* (2013.01)

(58) Field of Classification Search
CPC ................. G01D 5/20; G01D 5/244
See application file for complete search history.

(56) References Cited

U.S. PATENT DOCUMENTS

| 4,467,407 A | 8/1984 | Asano et al. |
| 8,339,076 B2 * | 12/2012 | Aoki ............... G01D 18/001 318/605 |

(Continued)

FOREIGN PATENT DOCUMENTS

| CN | 107342711 A | 11/2017 |
| CN | 109357698 A | 2/2019 |

(Continued)

OTHER PUBLICATIONS

JP 2008-304326 A English Translation (Year: 2008).*

(Continued)

*Primary Examiner* — Reena Aurora
(74) *Attorney, Agent, or Firm* — HAUPTMAN HAM, LLP (57) ABSTRACT

A control device of a rotation detector inputs an AC signal to an excitation coil and detects a rotation angle on the basis of a signal obtained by a detection coil. The control device includes: a controller that can output a plurality of excitation signals having a predetermined voltage; and a signal generation unit that generates the AC signal on the basis of the plurality of excitation signals output from the controller. In addition, the control device includes a voltage dividing circuit that is interposed between the controller and the signal generation unit and decreases the predetermined voltage of the plurality of excitation signals by a resistor to transmit the voltage to the signal generation unit.

4 Claims, 4 Drawing Sheets

(56) References Cited

U.S. PATENT DOCUMENTS

| | | | | |
|---|---|---|---|---|
| 8,660,743 | B2* | 2/2014 | Aoki | G01L 3/105 |
| | | | | 701/41 |
| 9,444,247 | B2* | 9/2016 | Kim | H02J 50/80 |
| 10,320,359 | B2* | 6/2019 | Bruckhaus | H03H 7/06 |
| 11,511,803 | B2* | 11/2022 | Kobayashi | B62D 15/025 |
| 11,597,436 | B2* | 3/2023 | Suzuki | B62D 15/0235 |
| 2007/0075674 | A1* | 4/2007 | Tsubota | H02P 6/16 |
| | | | | 318/811 |
| 2010/0327786 | A1* | 12/2010 | Aoki | H02P 6/15 |
| | | | | 318/400.04 |
| 2012/0109562 | A1* | 5/2012 | Yabuguchi | G01D 5/2046 |
| | | | | 702/87 |
| 2013/0261886 | A1* | 10/2013 | Aoki | G01L 3/105 |
| | | | | 702/41 |
| 2017/0317682 | A1* | 11/2017 | Shimizu | H02P 6/16 |
| 2018/0175818 | A1* | 6/2018 | Bruckhaus | H03H 7/06 |
| 2022/0041215 | A1* | 2/2022 | Suzuki | B62D 15/0235 |
| 2022/0089216 | A1* | 3/2022 | Kobayashi | G01L 3/104 |
| 2022/0291022 | A1* | 9/2022 | Shimahara | G01D 5/204 |
| 2023/0392958 | A1* | 12/2023 | Hamazaki | G01D 5/244 |

FOREIGN PATENT DOCUMENTS

| | | | | | |
|---|---|---|---|---|---|
| DE | 102006043878 | A1 | | 5/2007 | |
| JP | S58-112476 | A | | 7/1983 | |
| JP | 2002168653 | A | * | 6/2002 | |
| JP | 2004012387 | A | * | 1/2004 | |
| JP | 3695320 | B2 | * | 9/2005 | |
| JP | 2007-104768 | A | | 4/2007 | |
| JP | 2008304326 | A | * | 12/2008 | |
| JP | 2012-154890 | A | | 8/2012 | |
| JP | 5121951 | B2 | * | 1/2013 | |
| JP | 2013186105 | A | * | 9/2013 | |
| JP | 2017-201292 | A | | 11/2017 | |
| JP | 2018162641 | A | * | 10/2018 | |
| JP | 2020101384 | A | * | 7/2020 | |
| KR | 20190109856 | A | * | 9/2019 | |
| WO | WO-2008087545 | A2 | * | 7/2008 | G01D 5/2046 |
| WO | WO-2022124412 | A1 | * | 6/2022 | |

OTHER PUBLICATIONS

McAllister, Willy., Voltage divider (article) | Circuit analysis | Khan Academy. https://www.khanacademy.org/science/electrical-engineering/ee-circuit-analysis-topic/ee-resistor-circuits/a/ee-voltage-divider. wayback date of Nov. 12, 2020. (Year: 2020).*
International Search Report in PCT Application No. PCT/JP2021/045684, mailed Feb. 8, 2022, 7pp.
Written Opinion in PCT Application No. PCT/JP2021/045684, mailed Feb. 8, 2022, 9pp.
Office Action in CN Application No. 202180082217.X dated May 10, 2024, 16pp.
Slamacca, Calculation of Transient Processes in High and Low Voltage Power Grids, Mechanical Industry Press, Jan. 31, 1983, pp. 199-204, 12pp.

* cited by examiner

| PWM1 | PWM2 | OUTPUT VOLTAGE |
|---|---|---|
| OFF (0V) | OFF (0V) | 0V |
| ON (3.3V) | OFF (0V) | 1.1V |
| OFF (0V) | ON (3.3V) | 2.2V |
| ON (3.3V) | ON (3.3V) | 3.3V |

CONTROL DEVICE OF ROTATION DETECTOR

RELATED APPLICATIONS

The present application is a National Phase of International Application Number PCT/JP2021/045684 filed Dec. 10, 2021, which claims the benefit of priority from Japanese Patent Application No. 2020-205912, filed on Dec. 11, 2020.

BACKGROUND

Technical Field

The present disclosure relates to a control device of a rotation detector that inputs an AC signal to an excitation coil and detects a rotation angle based on a signal obtained by a detection coil.

Background Art

Typically, as a sensor (rotation detector) for detecting the relative rotation angle of a stator and a rotor, a sensor that inputs an AC signal to an excitation coil and detects a rotation angle based on a signal obtained by a detection coil is known. In such a sensor, there is proposed a technique for improving followability to a desired sine wave by changing the signal voltage to multiple stages. For example, there is known a technique for generating a multiple-stage voltage signal by switching a plurality of switches to selectively connect a positive electrode and a negative electrode of a plurality of capacitors to a load (see JP-A-58-112476).

CITATION LIST

Patent Literature

Patent Literature 1: JP-A-58-112476

DISCLOSURE OF THE INVENTION

Problems to be Solved by the Invention

However, typical techniques such as those described above require the use of multiple switches and capacitors. As a result, the circuit structure is easily complicated, and it is difficult to reduce the weight and size of the rotation detector. In addition, the shape of the voltage waveform may be disturbed and the signal accuracy may be reduced by the influence of noise that may occur when the multiple switches are disconnected and operated. Furthermore, since the circuit structure is complicated, there is a disadvantage that the manufacturing cost easily increases.

One object of the present application to provide a control device of a rotation detector that has been created in light of the above issue and is capable of improving signal accuracy with a simple configuration. Note that, without being limited to this object, the effect of operation derived from each configuration shown in "DETAILED DESCRIPTION" to be described later, which has an effect that cannot be obtained by the related art, can also be positioned as another object of the present application.

Solutions to the Problems

The control device of a rotation detector of the present disclosure is a control device of a rotation detector that inputs an AC signal to an excitation coil and detects a rotation angle based on a signal obtained by a detection coil, the control device of a rotation detector including: a controller that can output a plurality of excitation signals having a predetermined voltage; a signal generation unit that generates the AC signal based on the plurality of excitation signals output from the controller; and a voltage dividing circuit that is interposed between the controller and the signal generation unit and decreases the predetermined voltage of the plurality of excitation signals by a resistor to transmit the voltage to the signal generation unit.

Effects of the Invention

According to the control device of a rotation detector of a present disclosure, the signal accuracy can be improved with a simple configuration.

DESCRIPTION OF PREFERRED EMBODIMENTS

1. First Embodiment

[A. Configuration]

Figure 1:
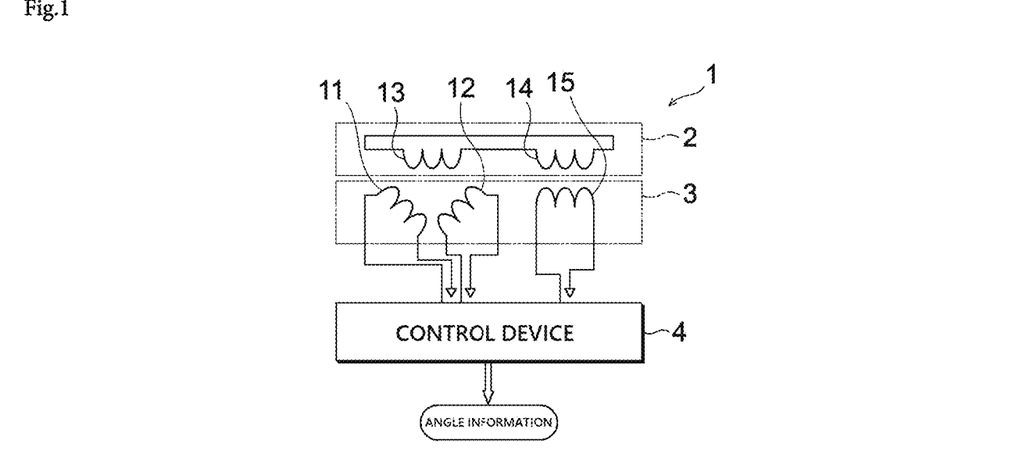
FIG. 1 is a schematic diagram illustrating a control device of a rotation detector as a first embodiment.

FIG. 1 is a schematic diagram illustrating a control device 4 of a rotation detector as a first embodiment. The rotation detector of the first embodiment is a modulation wave type resolver. A modulation wave type resolver is a resolver that inputs an amplitude-modulated AC signal to an excitation coil and detects a rotation angle based on a phase-modulated signal obtained by a detection coil. In the present application, as a specific example of a modulation wave type resolver, description will be given using a resolver 1 of a two-phase excitation single-phase output type having an axial double angle of 1X. However, the axial double angle may be other than 1X (nX), or the subject of the present disclosure is not intended to be limited only to resolver 1. The present disclosure is generally applicable to a rotation detector that inputs an AC signal (excitation signal) to an excitation coil and detects a rotation position using a signal generated in the detection coil.

The resolver 1 of the present application generates an excitation signal from a pulse width modulation (PWM) signal. A PWM signal is a signal having a square wave having variable pulse width and a constant period. The percentage of pulse width with respect to the period of the PWM signal is called the duty ratio. By changing the duty ratio to correspond to the voltage of the desired sine wave and passing the signal through the filter, a voltage waveform approximating the desired signal waveform (for example, a sine wave or a cosine wave) can be generated The resolver 1 is provided with a rotor 2 (rotating element) and a stator 3 (fixed element), and the excitation coil and the detection coil are disposed to face each other on these facing surfaces. The rotor 2 is a disk-shaped member that is rotatably supported with respect to the stator 3. In addition, the stator 3 is a disk-shaped member fixed to a casing (not illustrated).

As illustrated in FIG. 1, the resolver 1 includes a sine excitation coil 11, a cosine excitation coil 12, a detection coil 13, a transmission antenna coil 14, and a reception antenna coil 15. The sine excitation coil 11, the cosine excitation coil 12, and the reception antenna coil 15 are provided on the side of the stator 3, and the detection coil 13 and transmission antenna coil 14 are provided on the side of the rotor 2. The sine excitation coil 11 and the cosine excitation coil 12 are coils for inducing a voltage corresponding to the rotor angle (the rotation angle of the rotor 2 with respect to the stator 3) with respect to the detection coil 13 on the side of the rotor 2. In each of the excitation coils 11 and 12, an AC signal having an electric angle phase different from each other by 90 degrees is input.

The detection coil 13 (detection coil) is a coil disposed at a position facing the sine excitation coil 11 and the cosine excitation coil 12 in the axial direction of the rotor 2 on the facing surfaces of the rotor 2 and the stator 3. The voltage is induced in the detection coil 13 by interlinkage of magnetic flux generated by exciting the sine excitation coil 11 and the cosine excitation coil 12. The induced voltage or excitation current (AC signal) generated in the detection coil 13 acts on the transmission antenna coil 14. The transmission antenna coil 14 is a winding (coil) for returning the AC signal generated in the detection coil 13 to the side of the stator 3, and has both ends connected to both ends of the detection coil 13 to form a closed circuit. In addition, the reception antenna coil 15 is a coil disposed at a position facing the transmission antenna coil 14 in the axial direction of the rotor 2. The AC signal transmitted to the reception antenna coil 15 is input to the control device 4.

Figure 2:
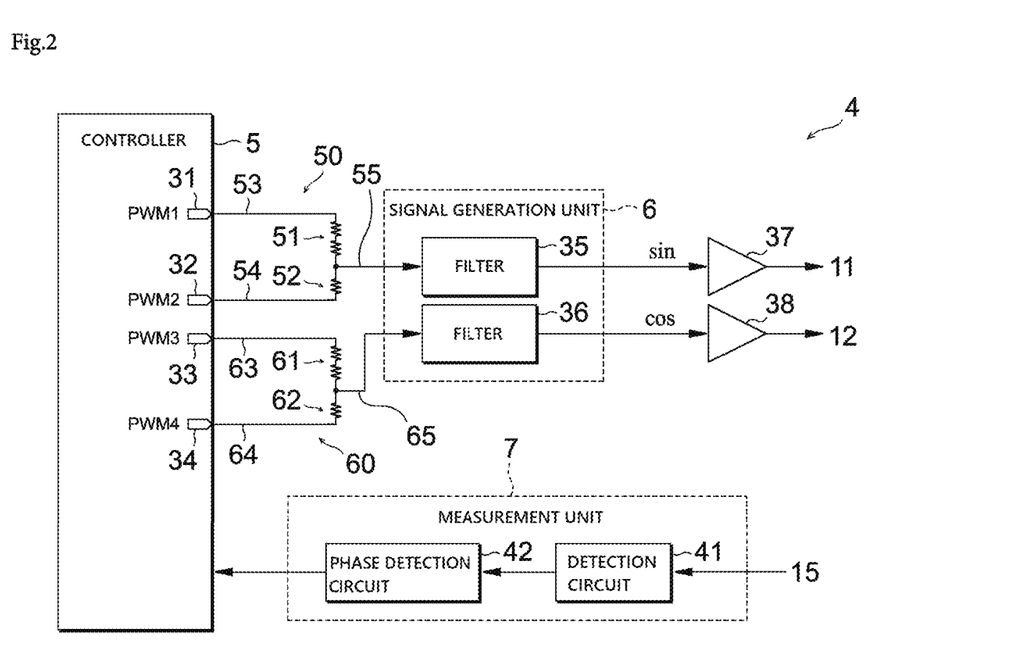
FIG. 2 is a block diagram illustrating a configuration of the control device illustrated in FIG. 1.

The control device 4 calculates and outputs a rotation angle of the rotor 2 with respect to the stator 3, and is also referred to as a resolver digital converter (RDC) circuit. As illustrated in FIG. 2, the control device 4 includes a controller 5, a signal generation unit 6, and a measurement unit 7. The controller 5 is an integrated circuit such as a field-programmable gate array (FPGA) or a programmable logic device (PLD), and has both a function of outputting a PWM signal and a function of detecting a rotation angle based on the phase-modulated signal. The controller 5 can output a plurality of PWM signals having a predetermined voltage (pulse voltage).

The controller 5 is provided with a first port 31, a second port 32, a third port 33, and a fourth port 34 that output a PWM signal. The first port 31 and the second port 32 output the same PWM signal having a duty ratio that changes to correspond to the sine wave voltage. In addition, the third port 33 and the fourth port 34 output the same PWM signal having a duty ratio that changes to correspond to the voltage of the cosine wave orthogonal to the sine wave.

The signal generation unit 6 generates an AC signal input to the excitation coils 11 and 12 based on the plurality of PWM signals output from the controller 5. The signal generation unit 6 is provided with a filter 35 for generating a sine wave AC signal and a filter 36 for generating a cosine wave AC signal. The filter 35 generates a sine wave modulated wave based on the PWM signal input from the first port 31 and the second port 32. The modulated wave generated here is amplified via an amplifier 37 and then transmitted to the sine excitation coil 11. Similarly, the filter 36 generates a cosine wave modulated wave based on the PWM signal input from the third port 33 and the fourth port 34. The modulated wave generated here is amplified via the amplifier 38 and then transmitted to the cosine excitation coil 12.

A sine side voltage dividing circuit 50 and a cosine side voltage dividing circuit 60 are interposed between the controller 5 and the signal generation unit 6. These voltage dividing circuits 50 and 60 are circuits for decreasing a predetermined voltage of the plurality of PWM signals output from the controller 5 by a resistor and then transmitting it to the signal generation unit 6. A sine side voltage dividing circuit 50 is interposed between the first port 31 and the second port 32 and the filter 35, and a cosine side voltage dividing circuit 60 is interposed between the third port 33 and the fourth port 34 and the filter 36.

As illustrated in FIG. 2, the sine side voltage dividing circuit 50 is provided with a first conducting wire 53, a second conducting wire 54, and a third conducting wire 55. The first conducting wire 53 is a conducting wire extending from the first port 31, and the second conducting wire 54 is a conducting wire extending from the second port 32 and merging with the first conducting wire 53. The third conducting wire 55 is a conducting wire that connects the junction of the first conducting wire 53 and the second conducting wire 54 to the filter 35 of the signal generation unit 6. Thus, the sine side voltage dividing circuit 50 has a circuit structure in which circuits to which PWM signals of two systems are transmitted are merged in the middle.

A first resistor 51 is interposed in the first conducting wire 53, and a second resistor 52 is interposed in the second conducting wire 54. The resistance values of the first resistor 51 and the second resistor 52 are set to magnitudes that differ at least from each other. For example, the first resistor 51 is formed by serially connecting two resistors having the same resistance as the second resistor 52, and the resistance value of the first resistor 51 is set to be twice the resistance value of the second resistor 52. In the first embodiment, the resistance value of the first resistor 51 is set in a manner that the voltage after the voltage drop in the first resistor 51 is one-third of the predetermined voltage. In addition, the resistance value of the second resistor 52 is set to half the resistance value of the first resistor 51. In other words, the resistance value is set in a manner that the voltage after the voltage drop in the second resistor 52 is two-thirds of the predetermined voltage. As a result, the voltage after the voltage drop in the second resistor 52 is two-thirds of the predetermined voltage.

Figure 3:
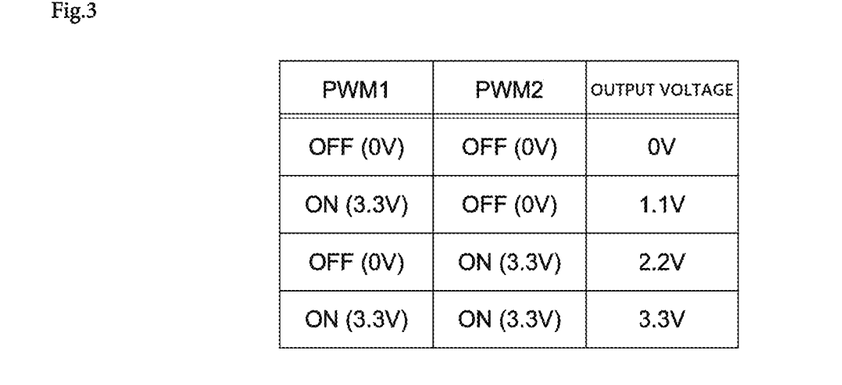
FIG. 3 is a table illustrating a relationship between the ON/OFF state of two excitation signals and output voltage of a voltage dividing circuit.

FIG. 3 is a table illustrating the relationship between the output state of the PWM signal from the first port 31 and the second port 32 and the voltage (output voltage) of the PWM signal transmitted to the filter 35 via the third conducting wire 55. Here, the predetermined voltage of the PWM signal is 3.3 V. In a state where both the first port 31 and the second port 32 do not output the PWM signal, the output voltage transmitted to the filter 35 is 0 V. In addition, in a state where only the first port 31 is outputting the PWM signal, the output voltage transmitted to the filter 35 is 1.1 V.

On the other hand, in a state where only the second port 32 is outputting the PWM signal, the output voltage transmitted to the filter 35 is 2.2 V. Furthermore, in a state where both the first port 31 and the second port 32 are outputting the PWM signal, the output voltage transmitted to the filter 35 is 3.3 V (predetermined voltage). Thus, by switching the output state of the PWM signal, the voltage of the PWM signal transmitted to the filter 35 is changed in multiple stages.

Similarly, the cosine side voltage dividing circuit 60 is provided with a first conducting wire 63, a second conducting wire 64, and a third conducting wire 65. The first conducting wire 63 is a conducting wire extending from the third port 33, and the second conducting wire 64 is a conducting wire extending from the fourth port 34 and merging with the first conducting wire 63. The third conducting wire 65 is a conducting wire that connects the junction of the first conducting wire 63 and the second conducting wire 64 to the filter 36. In addition, a first resistor 61 is interposed in the first conducting wire 63, and a second resistor 62 is interposed in the second conducting wire 64.

The resistance values of the first resistor 61 and the second resistor 62 are set to magnitudes that differ at least from each other, and the resistance value of the first resistor 61 preferably set to be twice the resistance value of the second resistor 62. In the first embodiment, similarly to the sine side voltage dividing circuit 50, the resistance value of the first resistor 61 is set in a manner that the voltage after the voltage drop in the first resistor 61 is one-third of the predetermined voltage. In addition, the resistance value of the second resistor 62 is set to half the resistance value of the first resistor 61. In other words, the resistance value is set in a manner that the voltage after the voltage drop in the second resistor 62 is two-thirds of the predetermined voltage.

The measurement unit 7 is provided with a detection circuit 41 and a phase detection circuit 42. The detection circuit 41 is a circuit that detects the phase-modulated AC signal input from the reception antenna coil 15 and extracts a signal wave. The extracted signal wave is transmitted to the phase detection circuit 42. In the phase detection circuit 42, the magnitude of the phase shift of the signal wave extracted by the detection circuit 41 is grasped with reference to the modulated wave transmitted to the sine excitation coil 11, and the information is transmitted to the controller 5. Upon receiving this information, the controller 5 calculates the rotation angle of the rotor 2 with respect to the stator 3.

[B. Action]

As described above, in the case of a rotation detector that inputs a signal of a predetermined signal waveform to the excitation coil and outputs a predetermined modulated signal by the detection coil, a high signal accuracy is required because the detection result is affected by the accuracy of the input signal. On the other hand, in a case where the voltage value (corresponding to the amplitude of the PWM signal) of the pulse included in the PWM signal is constant, the shape of the voltage waveform is less likely to follow the desired sine wave in a state where the duty ratio is near 0% and 100% in terms of the temporal resolution constraint of the pulse width, and the signal accuracy may be reduced.

Therefore, there is proposed a technique for improving followability to a desired sine wave by changing the pulse voltage value to multiple stages (see Patent Literature 1). For example, Patent Literature 1 describes generating a multiple-stage voltage signal by switching a plurality of switches to selectively connect a positive electrode and a negative electrode of a plurality of capacitors to a load. However, to achieve a configuration described in Patent Literature 1 require the use of multiple switches and capacitors. As a result, the circuit structure is easily complicated, and it is difficult to reduce the weight and size of the rotation detector. In addition, the shape of the voltage waveform may be disturbed and the signal accuracy may be reduced by the influence of noise that may occur when the multiple switches are disconnected and operated. Furthermore, since the circuit structure is complicated, there is a disadvantage that the manufacturing cost easily increases.

Figure 4A:
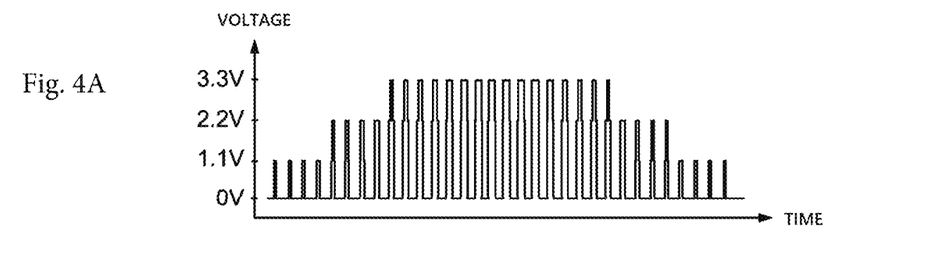
FIG. 4A is a graph illustrating an excitation signal generated by the control device illustrated in FIG. 2.
Figure 4B:
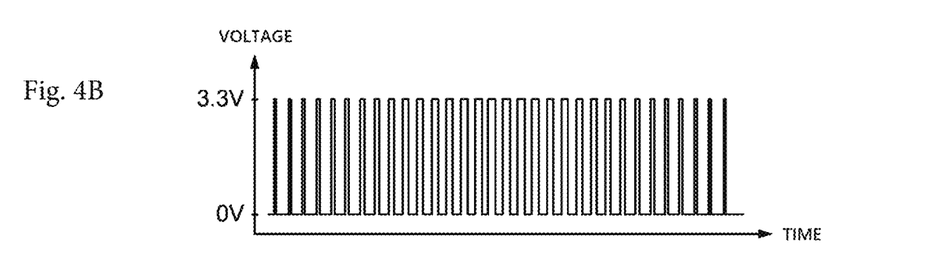
FIG. 4B is a graph illustrating an excitation signal as a comparative example.

In contrast, in the control device 4 according to the first embodiment, the voltage of the PWM signal transmitted to the filters 35 and 36 of the signal generation unit 6 is changed in multiple stages. For example, in the typical control in which the voltage of the PWM signal is constant, the waveform becomes the waveform of the PWM signal as illustrated in FIG. 4B and has a shape in which square waves with the same wave height are connected. On the other hand, in terms of the temporal resolution constraint of the pulse width, the shape of the voltage waveform after passing through the filters 35 and 36 is less likely to be a clean sine wave or cosine wave, and the signal accuracy may be reduced. In contrast, the above control device 4 improves the resolution of the voltage, and as illustrated in FIG. 4A, the waveform becomes the waveform of the PWM signal having a voltage value that changes in multiple stages. As a result, the shape of the voltage waveform after passing through the filters 35 and 36 can easily follow the desired sine wave or cosine wave, and the signal accuracy is improved.

Figure 5A:
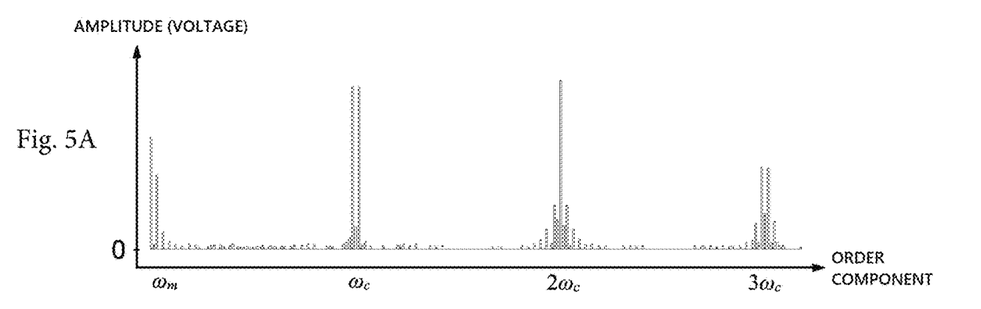
FIG. 5A is a graph illustrating a second-order harmonic and a third-order harmonic included in a one-phase excitation signal.

FIG. 5A is a graph illustrating results of a discrete Fourier transformation (DFT) analysis of a waveform of a PWM signal in the typical control in which the voltage of the PWM signal is constant. The horizontal axis represents the frequency (order component), and the vertical axis represents the amplitude. Symbol tom is the frequency of the desired sine wave or cosine wave (the frequency of the voltage waveform after passing through the filters 35 and 36), and ωc is the frequency of the PWM signal. In addition, 2 ωc is the frequency corresponding to the second-order harmonic of the PWM signal, and 3 ωc is the frequency corresponding to the third-order harmonic of the PWM signal.

Figure 5B:
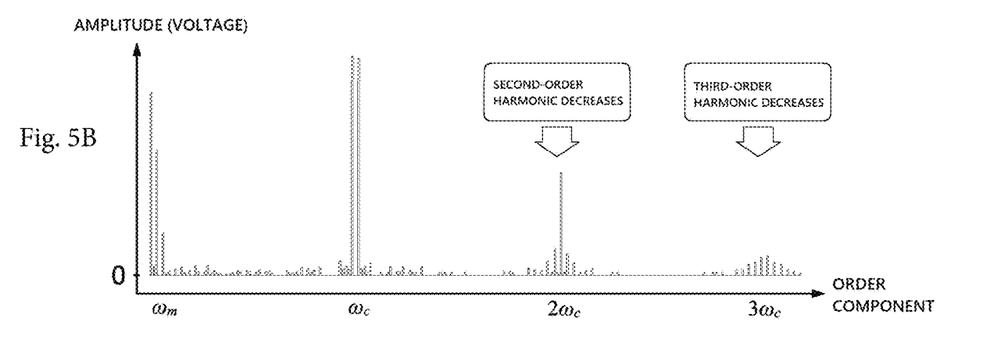
FIG. 5B is a graph illustrating a second-order harmonic and a third-order harmonic included in the excitation signal of the first embodiment.

As illustrated in FIG. 5A, the waveform of the PWM signal includes higher-order harmonic components such as a second-order harmonic and a third-order harmonic. Although these harmonic components are removed by the filters 35 and 36 of the signal generation unit 6, the removal efficiency depends on the performance of the filters 35 and 36. In contrast, as illustrated in FIG. 5B, in the above control device 4, the second-order harmonic or the third-order harmonic decreases. Thus, since the signal characteristics before input to the filters 35 and 36 are improved, the shape of the voltage waveform after passing through the filters 35 and 36 can easily follow the desired sine wave or cosine wave, and the signal accuracy is improved. In addition, since the signal characteristics themselves of the PWM signal are improved, there is no need to request excessive performance of the filters 35 and 36.

[C. Effects]

(1) The control device 4 of a rotation detector of the first embodiment is provided with the voltage dividing circuits 50 and 60 interposed between the controller 5 and the signal generation unit 6. The voltage dividing circuits 50 and 60 function to decrease a predetermined voltage of the plurality of PWM signals by the resistor and transmit it to the signal generation unit 6. This makes it possible to easily generate a PWM signal in which the voltage value changes in multiple stages. Therefore, the voltage waveform after passing through the filters 35 and 36 with a simple configuration may be a clean sine wave or a cosine wave, and the signal accuracy of the excitation signal output from the signal generation unit 6 can be improved. In addition, harmonic components of the PWM signal can be reduced, and signal accuracy can be further improved.

(2) As illustrated in FIG. 2, the above controller 5 is provided with the first port 31 and the second port 32 that output the same PWM signal. In addition, concerning the sine side voltage dividing circuit 50, the first resistor 51 is interposed in the first conducting wire 53 extending from the first port 31, and the second resistor 52 is interposed in the second conducting wire 54 extending from the second port 32. These conducting wires 53 and 54 are formed to be merged, and the junction is connected to the signal generation unit 6 by the third conducting wire 55. Such a structure allows forming a circuit, in which the voltage of the two types of PWM signals to be switched or combined (voltage value added), to be easily formed. Therefore, a voltage waveform approximated to the appropriate sine wave can be generated by the signal generation unit 6, and the signal accuracy can be improved with a simple configuration.

The same applies to the cosine side voltage dividing circuit 60. The first resistor 61 is interposed in the first conducting wire 63 extending from the third port 33, and the second resistor 62 is interposed in the second conducting wire 64 extending from the fourth port 34. These conducting wires 63 and 64 are formed to be merged, and the junction is connected to the signal generation unit 6 by the third conducting wire With such a configuration, a voltage waveform approximated to the appropriate cosine wave can be generated by the signal generation unit 6, and the signal accuracy can be improved with a simple configuration.

(3) In the above voltage dividing circuits 50 and 60, the resistance values of the first resistors 51 and 61 are set to be twice the resistance values of the second resistors 52 and 62. This can double the voltage drop of the PWM signal passing through the first conducting wire 53 as compared with the voltage drop of the PWM signal passing through the second conducting wire 54, and can greatly differ the voltage value. In addition, compared with a state where only the first port 31 is outputting the PWM signal, the voltage value in a state where only the second port 32 is outputting the PWM signal can be doubled.

For example, as illustrated in FIG. 3, in a state where only the first port 31 is outputting the PWM signal, the output voltage transmitted to the filter 35 is 1.1 V, and in a state where only the second port 32 is outputting the PWM signal, the output voltage transmitted to the filter 35 is 2.2 V. Thus, it is possible to easily generate an intermediate potential of the PWM signal in which the voltage changes in two stages at equal intervals, and to further improve signal accuracy.

(4) In the above voltage dividing circuits 50 and 60, the resistance values of the first resistors 51 and 61 are set in a manner that the voltage after the voltage drop in the first resistors 51 and 61 is one-third of the predetermined voltage. In addition, the resistance values of the second resistors 52 and 62 are set in a manner that the voltage after the voltage drop in the second resistors 52 and 62 is two-thirds of the predetermined voltage. As a result, it is possible to easily generate an intermediate potential of the PWM signal in which the voltage changes in three stages at equal intervals, and to further improve signal accuracy.

2. Second Embodiment

Figure 6:
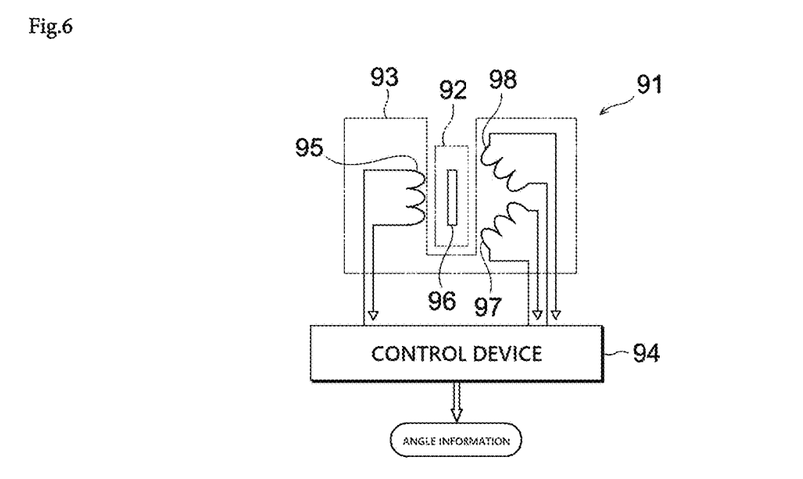
FIG. 6 is a schematic diagram illustrating a control device of a rotation detector as a second embodiment.
Figure 7:
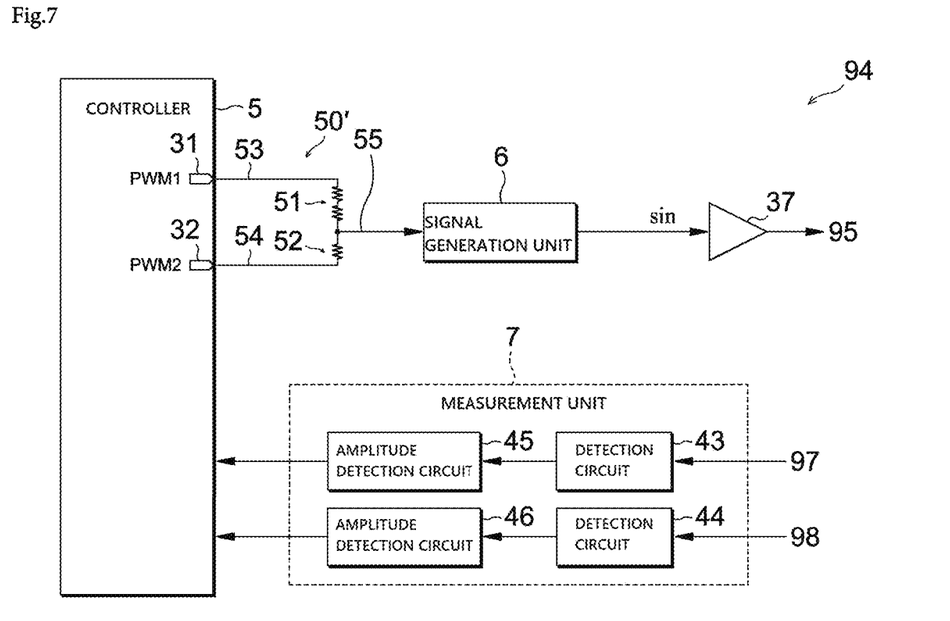
FIG. 7 is a block diagram illustrating a configuration of the control device illustrated in FIG. 6.

FIG. 6 is a schematic diagram illustrating a control device 94 of a rotation detector as a second embodiment, and FIG. 7 is a block diagram illustrating a configuration of the control device 94. The rotation detector according to the second embodiment is an inductive type resolver (inductive sensor). An inductive type resolver is a resolver that inputs an AC signal of a predetermined amplitude to an excitation coil and detects a rotation angle based on an amplitude-modulated signal obtained by a detection coil. In the present application, as a specific example of an inductive type resolver, description will be given using a resolver 91 of a one-phase excitation two-phase output type having an axial double angle of 1X. However, the axial double angle may be other than 1X (nX).

The resolver 91 includes a rotor 92 (rotating element), a stator 93 (fixed element), and the control device 94. The rotor 92 is a disk-shaped member that is rotatably supported with respect to the stator 93. The stator 93 is a disk-shaped member fixed to a casing (not illustrated). The stator 93 is provided with an excitation coil 95 or detection coils 97 and 98. On the other hand, the rotor 92 is not provided with a coil but provided with a conductor 96.

The conductor 96 is formed in a shape in which the area affected by the magnetic field generated by the excitation coil 95 changes according to the relative angles of the rotor 92 and the stator 93. Specifically, the disk is multi-divided in the circumferential direction, and the multi-divided disk pieces are alternately removed along the circumferential direction (a shape in which the remaining disk pieces are also disposed by skipping one by removing the disk pieces by skipping one). Note that a typical division number of such a disk is a power of two (for example, two, four, and eight). The shape of each conductor 96 may not be "solid" and may be, for example, "a closed ring shape that surrounds only the outer periphery".

The control device 94 calculates and outputs a rotation angle of the rotor 92 with respect to the stator 93. The control device 94 includes a signal generating circuit that generates an AC signal supplied to the excitation coil 95, and a signal processing circuit that outputs angle information corresponding to the rotation angle based on the signal returned from the detection coils 97 and 98. The AC signal generated by the signal generation circuit is transmitted to the excitation coil 95, and a predetermined magnetic field is formed in the stator 93. Thus, eddy current flows into the conductor 96 of the rotor 92, and a magnetic field (diamagnetic field) that cancels the magnetic field of the stator 93 is generated to shield the magnetic field. The position of the conductor 96 of the rotor 92 changes according to the rotation angle. Therefore, the amplitude-modulated signal is returned to the detection coils 97 and 98 on the side of the stator 93 according to the rotation angle. The signal is input to a signal processing circuit.

The excitation coil 95 is a coil that generates an axial magnetic field. The conductor 96 on the side of the rotor 92 facing the stator 93 in the axial direction receives the magnetic field of the excitation coil 95 and generates an eddy current inside to generate a diamagnetic field that cancels the magnetic field of the excitation coil 95. Thus, the conductor 96 shields a part of the magnetic field of the excitation coil 95. The amplitude of the AC signal input to the excitation coil 95 can be changed according to the instruction of the control device 94. Here, the voltage value of the AC signal input to the excitation coil 95 is expressed as "sin ωct". Symbol ωct is the angular velocity of the AC signal.

The detection coils 97 and 98 detect the magnetic field of the excitation coil 95. Since the conductor 96 on the side of the rotor 2 facing in the axial direction moves in the circumferential direction with the rotation of the rotor 92, the portion of the conductor 96 that shields the magnetic field of the excitation coil 95 changes according to the rotor angle. Therefore, the magnetic field detected by the detection coils 97 and 98 also changes according to the rotor angle.

The detection coils 97 and 98 include a sine detection coil 97 and a cosine detection coil 98. The sine detection coil 97 detects the sine wave of the rotor angle and the cosine detection coil 98 detects the cosine wave of the rotor angle. If the rotor angle is θ, the voltage value of the AC signal output from the sine detection coil 97 can be expressed as "sin θ·sin ωct". In addition, the voltage value of the AC signal output from the cosine detection coil 98 is can be expressed as "cos θ·sin ωct". Thus, the amplitude of the modulated wave obtained in each of the detection coils 97 and 98 changes according to the change in the rotor angle. Accordingly, the rotor angle can be determined on the basis of these amplitudes. The signals detected by each of the detection coils 97 and 98 are input to the control device 94.

Similarly to the control device 4 of the first embodiment, the control device 94 includes a controller 5, a signal generation unit 6, and a measurement unit 7. The controller 5 is an integrated circuit such as a field-programmable gate array (FPGA) or a programmable logic device (PLD), and has both a function of outputting an excitation signal and a function of detecting a rotation angle on the basis of the amplitude-modulated signal. The controller 5 can output a plurality of excitation signals having a predetermined voltage (pulse voltage), and includes a first port 31 and a second port 32 that output the excitation signals.

The signal generation unit 6 generates an AC signal input to the excitation coil 95 on the basis of the plurality of excitation signals output from the controller 5. The AC signal generated here is amplified via an amplifier 37 and then transmitted to the excitation coil 95. A voltage dividing circuit 50' is interposed between the controller 5 and the signal generation unit 6. The voltage dividing circuit 50' is a circuit for decreasing a predetermined voltage of the plurality of excitation signals output from the controller 5 by a resistor and then transmitting it to the signal generation unit 6.

As illustrated in FIG. 7, the voltage dividing circuit 50' is provided with a first conducting wire 53, a second conducting wire 54, and a third conducting wire 55. The first conducting wire 53 is a conducting wire extending from the first port 31, and the second conducting wire 54 is a conducting wire extending from the second port 32 and merging with the first conducting wire 53. The third conducting wire 55 is a conducting wire that connects the junction of the first conducting wire 53 and the second conducting wire 54 to the filter 35 of the signal generation unit 6. Thus, the sine side voltage dividing circuit 50 has a circuit structure in which circuits to which PWM signals of two systems are transmitted are merged in the middle.

A first resistor 51 is interposed in the first conducting wire 53, and a second resistor 52 is interposed in the second conducting wire 54. The resistance values of the first resistor 51 and the second resistor 52 are set to magnitudes that differ at least from each other. For example, the first resistor 51 is formed by serially connecting two resistors having the same resistance as the second resistor 52, and the resistance value of the first resistor 51 is set to be twice the resistance value of the second resistor 52. In the second embodiment, the resistance value of the first resistor 51 is set in a manner that the voltage after the voltage drop in the first resistor 51 is one-third of the predetermined voltage. In addition, the resistance value of the second resistor 52 is set to half the resistance value of the first resistor 51. In other words, the resistance value is set in a manner that the voltage after the voltage drop in the second resistor 52 is two-thirds of the predetermined voltage. As a result, the voltage after the voltage drop in the second resistor 52 is two-thirds of the predetermined voltage.

The measurement unit 7 is provided with detection circuits 43 and 44 and amplitude detection circuits 45 and 46. The detection circuits 43 and 44 are circuits that detect the amplitude-modulated AC signal input from the detection coils 97 and 98 and extract a signal wave. The extracted signal wave is transmitted to the amplitude detection circuits 45 and 46. In the amplitude detection circuits 45 and 46, the magnitude of the amplitude of the signal wave extracted by the detection circuits 45 and 46 is grasped with reference to the modulated wave transmitted to the excitation coil 95, and the information is transmitted to the controller 5. Upon receiving this information, the controller 5 calculates the rotation angle of the rotor 2 with respect to the stator 3.

As described above, the control device 94 of a rotation detector of the second embodiment is provided with the voltage dividing circuit 50' interposed between the controller 5 and the signal generation unit 6. The voltage dividing circuit 50' functions to decrease a predetermined voltage of the plurality of excitation signals by the resistor and transmit it to the signal generation unit 6. As a result, harmonic components of the excitation signal can be reduced, and signal accuracy can be further improved. In addition, in a case where the voltage value is desired to be changed in multiple stages, the voltage waveform can be approximated to a clean sine wave or a cosine wave, and the signal accuracy of the excitation signal output from the signal generation unit 6 can be improved.

[3. Modification]

The above embodiments (first embodiment and second embodiment) are merely exemplary and are not intended to preclude the application of various modifications and techniques that are not explicitly described in the above embodiments. Each configuration in the above embodiments can be implemented in various ways without departing from the gist. In addition, each configuration of the above embodiments can be selected as required or can be appropriately combined with various configurations included in the known technique.

Figure 8:
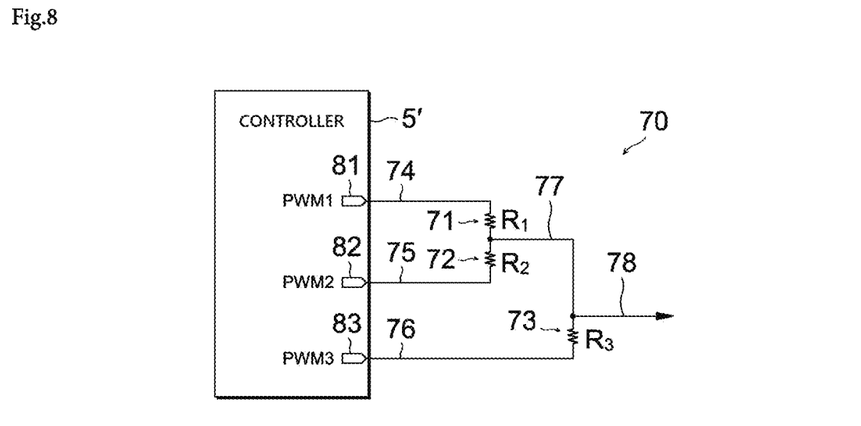
FIG. 8 is a circuit diagram illustrating a structure of a voltage dividing circuit as a modification.

Although the above example illustrates the voltage dividing circuits 50, 50', and 60 that use two types of resistors to change the voltage of the excitation signal in stages, three or more types of resistors may be used to increase the number of change stages of the voltage. FIG. 8 is a circuit diagram illustrating a structure of a voltage dividing circuit 70 as a modification. A controller 5' of a rotation detector to which the voltage dividing circuit 70 is applied is provided with a first port 81, a second port 82, and a third port 83 that output the same excitation signal. In addition, the voltage dividing circuit 70 includes a first conducting wire 74 extending from the first port 81, a second conducting wire 75 extending from the second port 82 and merging with the first conducting wire 74, and a third conducting wire 76 extending from the third port 83.

A first resistor 71 is interposed in the first conducting wire 74, a second resistor 72 is interposed in the second conducting wire 75, and a third resistor 73 is interposed in the third conducting wire 76. In addition, a fourth conducting wire 77 is provided for connecting the junction between the first conducting wire 74 and the second conducting wire 75 and the downstream side of the third resistor 73 of the third conducting wire 76. Furthermore, a fifth conducting wire 78 is provided for connecting the junction between the third conducting wire 76 and the fourth conducting wire 77 and the signal generation unit (not illustrated).

The resistance values of the first resistor 71, the second resistor 72, and the third resistor 73 are set in a manner that the voltage changes in stages by switching the output state of the excitation signal. The number of stages of change in voltage in a case where three ports 81 to 83 are used is up to 8 stages (23 stages). Thus, by decreasing the predetermined voltage of the plurality of excitation signals by the resistors 71 to 73, the excitation signal having a voltage value that changes in multiple stages can be easily generated, and the same operation effect as the above embodiments can be obtained.

In addition, the control device 4 of the resolvers 1 and 91 having an axial double angle of 1X is detailed in the above embodiments, a similar control device 4 may be applied to the resolvers 1 and 91 having an axial double angle of nX, or a similar control device 4 may be applied to the single-phase excitation two-phase output type resolver. If the rotation detector inputs an AC signal to an excitation coil and detects a rotation angle on the basis of a signal obtained by a detection coil, the same operation effect as in the above embodiments can be obtained by applying the same control device 4 as in the above embodiments.

DESCRIPTION OF REFERENCE SIGNS 1, 91 resolver (rotation detector)
2, 92 rotor
3, 93 stator
4, 94 control device
5 controller
6 signal generation unit
7 measurement unit
31 first port
32 second port
33 third port
34 fourth port
50, 50', 60 voltage dividing circuit
51, 61 first resistor
52, 62 second resistor
53, 63 first conducting wire
54, 64 second conducting wire
55, 65 third conducting wire

The invention claimed is:

1. A control device of a rotation detector that inputs an AC signal to an excitation coil on a stator and detects a rotation angle on the basis of a signal obtained by a detection coil on a rotor, the control device of a rotation detector comprising:

a controller that can output a plurality of excitation signals having a predetermined voltage, wherein each of the plurality of excitation signals is a pulse width modulation (PWM) signal;
a signal generation unit that generates the AC signal on the basis of the plurality of excitation signals output from the controller; and
a voltage dividing circuit that is interposed between the controller and the signal generation unit and decreases the predetermined voltage of the plurality of excitation signals by a resistor to transmit the voltage to the signal generation unit,
wherein the controller includes a first port and a second port that output the plurality of excitation signals,
the voltage dividing circuit includes a first conducting wire having a first resistor interposed and extending from the first port, a second conducting wire having a second resistor interposed and that has a resistance value different from that of the first resistor, extending from the second port, and merging with the first conducting wire, and a third conducting wire connecting a junction of the first conducting wire and the second conducting wire and the signal generation unit,
the resistance value of the first resistor is twice the resistance value of the second resistor,
the resistance value of the first resistor is set in a manner that the voltage after a voltage drop in the first resistor is one-third of the predetermined voltage in a state where only the first port is outputting the PWM signal, and
the voltage of the PWM signal passing through the third conducting wire is changed in multiple stages at equal intervals.

2. The control device of a rotation detector according to claim 1, wherein
the rotation detector is an inductive type resolver that inputs the AC signal of a predetermined amplitude to the excitation coil and detects the rotation angle on the basis of an amplitude-modulated signal obtained by the detection coil.

3. The control device of a rotation detector according to claim 1, wherein
the rotation detector is a modulation wave type resolver that inputs an amplitude-modulated AC signal to the excitation coil and detects the rotation angle on the basis of a phase-modulated signal obtained by the detection coil.

4. The control device of a rotation detector according to claim 1, wherein
the voltage of the PWM signal passing through the third conducting wire is changed in four stages at equal intervals.

* * * * *